(12) United States Patent  
Sueoka et al.

(10) Patent No.: US 9,180,592 B2
(45) Date of Patent: Nov. 10, 2015

(54) PISTON SUPPLY APPARATUS AND PISTON SUPPLY METHOD

(71) Applicant: HIRATA CORPORATION, Shinagawa-ku (JP)

(72) Inventors: Hisayuki Sueoka, Shinagawa-ku (JP); Yasuhiko Wakatsuki, Shinagawa-ku (JP)

(73) Assignee: HIRATA CORPORATION, Shinagawa-Ku, Tokyo (JP)

( * ) Notice: Subject to any disclaimer, the term of this patent is extended or adjusted under 35 U.S.C. 154(b) by 119 days.

(21) Appl. No.: 14/035,163

(22) Filed: Sep. 24, 2013

(65) Prior Publication Data

US 2014/0023472 A1   Jan. 23, 2014

Related U.S. Application Data

(63) Continuation of application No. PCT/JP2011/002279, filed on Apr. 19, 2011.

(51) Int. Cl.
  *B23P 19/00* (2006.01)
  *B25J 9/00* (2006.01)
  *B23P 19/04* (2006.01)

(52) U.S. Cl.
  CPC .............. *B25J 9/0084* (2013.01); *B23P 19/001* (2013.01); *B23P 19/043* (2013.01)

(58) Field of Classification Search
  CPC .......... B23P 19/04; B23P 19/043; B25J 9/00; B25J 9/0084
  See application file for complete search history.

(56) References Cited

U.S. PATENT DOCUMENTS

| 6,047,472 A * | 4/2000 | Koch et al. ................. 29/888.01 |
| 6,367,141 B1 * | 4/2002 | Cook et al. .................... 29/407.1 |
| 6,438,833 B1 * | 8/2002 | Cook et al. ................. 29/888.01 |

(Continued)

FOREIGN PATENT DOCUMENTS

| DE | 10105327 A1 * | 8/2002 | ............. B23P 19/04 |
| JP | 63-260730 A | 10/1988 | |

(Continued)

OTHER PUBLICATIONS

International Search Report (PCT/ISA/210) mailed on Jul. 12, 2011, by the Japanese Patent Office as the International Searching Authority for International Application No. PCT/JP2011/002279.

(Continued)

*Primary Examiner* — Lee D Wilson
*Assistant Examiner* — Tyrone V Hall, Jr.
(74) *Attorney, Agent, or Firm* — Buchanan Ingersoll & Rooney PC

(57) ABSTRACT

A piston supply apparatus includes a piston gripping portion and a piston supply portion. The piston supply portion includes a connecting rod gripping unit gripping the connecting rod of the piston placed in a preparation area, a guide member abutting against a skirt portion of the piston to match an axial direction of the piston with a predetermined specified direction, a moving unit moving the gripping unit from the preparation area to a supply position in air, and a pivoting unit making the gripping unit pivot such that the piston top portion of the piston in a downward state is set in an upward state. The piston supply apparatus further includes a pressing unit pressing the piston top portion of the piston made to pivot to the upward state against the guide member.

6 Claims, 15 Drawing Sheets

(56) References Cited

U.S. PATENT DOCUMENTS

| | | | |
|---|---|---|---|
| 6,467,155 B1* | 10/2002 | Cook et al. | 29/714 |
| 6,658,713 B1* | 12/2003 | Wittum et al. | 29/267 |
| 2001/0024044 A1* | 9/2001 | Kosuge et al. | 294/28 |
| 2003/0167628 A1* | 9/2003 | Tachibana et al. | 29/791 |
| 2004/0194296 A1* | 10/2004 | Kosuge et al. | 29/714 |

FOREIGN PATENT DOCUMENTS

| JP | 1-281832 A | 11/1989 |
|---|---|---|
| JP | 2-088132 A | 3/1990 |
| JP | 5-192831 A | 8/1993 |
| JP | 11-114736 A | 4/1999 |
| JP | 2001-328035 A | 11/2001 |
| JP | 2003-266255 A | 9/2003 |
| JP | 2009-113129 A | 5/2009 |

OTHER PUBLICATIONS

Written Opinion (PCT/ISA/237) mailed on Jul. 12, 2011, by the Japanese Patent Office as the International Searching Authority for International Application No. PCT/JP2011/002279.

* cited by examiner

F I G. 2
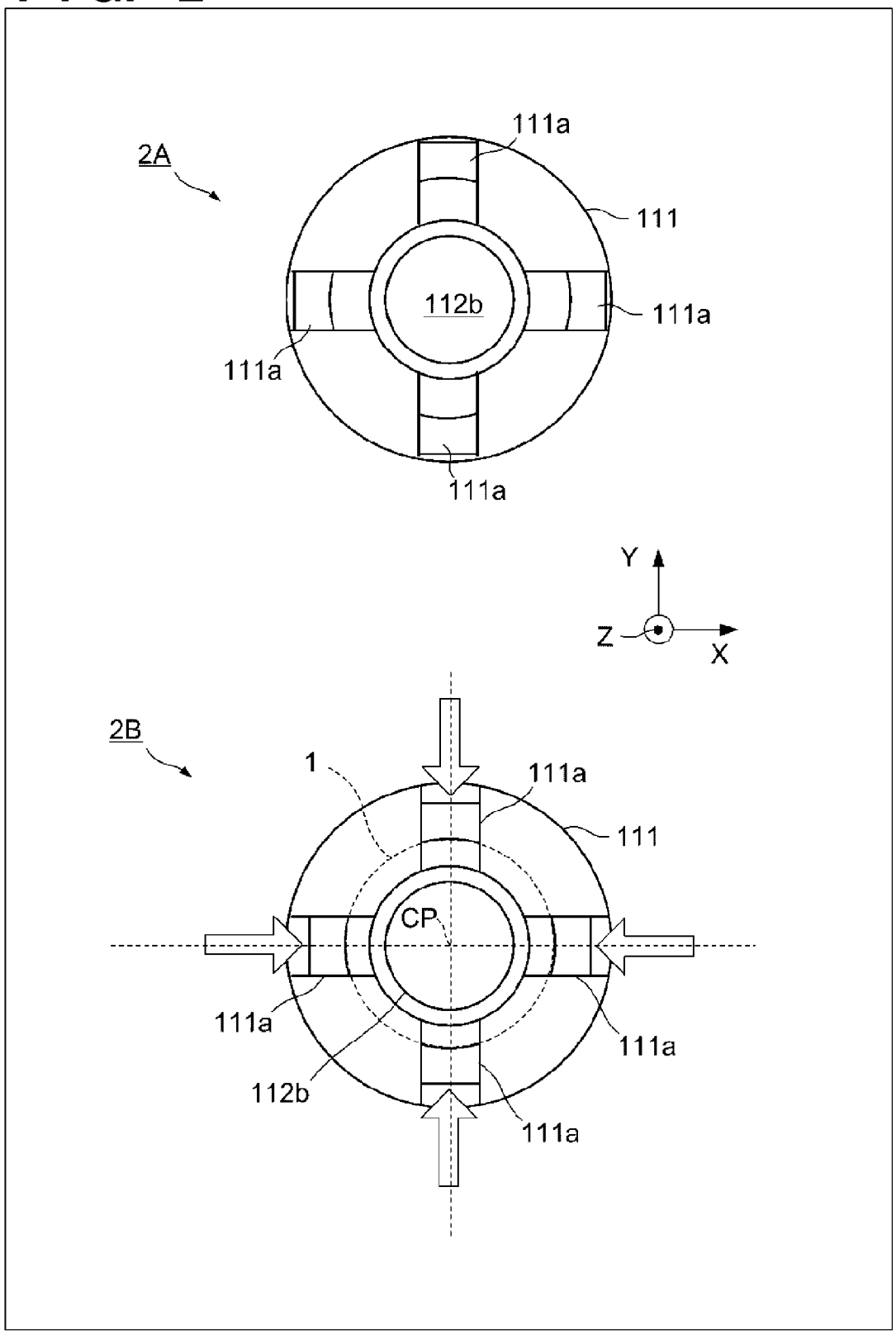

PISTON SUPPLY APPARATUS AND PISTON SUPPLY METHOD

This application is a continuation of International Patent Application No. PCT/JP2011/002279 filed on Apr. 19, 2011, the entire content of which is incorporated herein by reference.

BACKGROUND OF THE INVENTION

1. Field of the Invention

The present invention relates to an apparatus and method which supply a piston when assembling it in the cylinder block of an engine.

2. Description of the Related Art

It is necessary to insert a piston into the cylinder bore formed in a cylinder block upon diameter reduction of a piston ring. Under the circumstance, there has been proposed a method of inserting a piston into a cylinder bore by pushing the piston out of a dedicated guide tube upon temporarily inserting the piston into the guide tube while the diameter of a piston ring is reduced (Japanese Patent Laid-Open No. 2003-266255).

When inserting a piston into a cylinder bore, in order to prevent the cylinder bore and a connecting rod from interfering with each other, a cylinder block is set to make the cylinder bore face vertically, and the piston is set in a guide tube so as to make the connecting rode face vertically. For this reason, a piston gripping robot designed to insert a piston into a guide tube grips the outer surface of the piston while the top portion of the piston faces upward and then inserts the piston into the guide tube.

Depending on the arrangement of an automatic assembly system, a piston with a connecting rod before insertion into a cylinder bore is sometimes prepared by being mounted on a pallet while the top portion of the piston faces downward depending on procedures for a series of assembly operations for the piston and the connecting rod. When automating a series of operations from assembly operations for a piston and a connecting rod to the operation of inserting the piston into a cylinder bore, it is necessary to transfer the piston to a piston gripping robot upon reversing the posture of the piston from a downward state to an upward state.

As a procedure for transferring a piston to a piston gripping robot upon reversing the posture of the piston, the following procedure may be used: making a posture reversing robot pick up a piston from a pallet or the like, revere the posture of the piston, and mount the piston on the pallet or the like, and making the piston gripping robot pick up the piston. This procedure, however, requires a tact time when mounting a piston on a pallet or the like. The tact time can be shortened if it is possible to make the posture reversing robot directly transfer a piston to the piston gripping robot in air upon reversing the posture of the piston.

However, since the piston gripping robot needs to grip the outer surface of a piston, the posture reversing robot reverses the posture of the piston upon gripping the connecting rod. The centrifugal force generated at the time of reversing may shift the gripping position of the posture reversing robot. As a consequence, the posture of the piston may shift relative to the connecting rod. Transferring the piston to the piston gripping robot in air in this state will degrade the accuracy of piston gripping.

SUMMARY OF THE INVENTION

It is an object of the present invention to correct a posture shift at the time of piston reversal and transfer the piston in air more accurately.

According to the present invention, there is provided a piston supply apparatus comprising a piston gripping portion which grips a piston to which a connecting rod is assembled so as to insert the piston into a cylinder bore, and a piston supply portion which supplies the piston to the piston gripping portion, wherein the piston supply portion comprises a connecting rod gripping unit which grips the connecting rod of the piston placed in a preparation area while a piston top portion faces downward, a guide member which abuts against an end portion of a skirt portion of the piston which is located on an opposite side to the piston top portion so as to match an axial direction of the piston with a predetermined specified direction, a moving unit which moves the connecting rod gripping unit gripping the connecting rod from the preparation area to a supply position in air at which the piston is supplied to the piston gripping portion, and a pivoting unit which makes the connecting rod gripping unit pivot such that the piston top portion of the piston into the downward state is set in an upward state, and the piston supply apparatus further comprises a pressing unit which presses the piston top portion of the piston made to pivot to the upward state against the guide member before the piston gripping portion grips the piston.

In addition, according to the present invention, there is provided a piston supply method of supplying a piston assembled to a connecting rod to a piston gripping portion which grips the piston to insert the piston into a cylinder bore, characterized by comprising a gripping step of gripping the connecting rod in a piston preparation area in which the piston is prepared in a downward state in which a top portion of the piston faces downward, a moving step of moving the piston while griping the connecting rod from a position at which the connecting rod is gripped to a supply position in air at which the piston is supplied to the piston gripping portion, a pivoting step of making the piston pivot while gripping the connecting rod such that the piston in the downward state is set in an upward state in which the top portion faces upward, while the piston is moved while the connecting rod is gripped, and a guiding step of guiding the piston so as to match an axial direction of the piston with a predetermined specified direction by pressing the top portion against a horizontal guide portion placed near a lower end of a skirt portion of the piston to make the lower end of the skirt portion abut against the horizontal guide portion after the piston is set in the upward state in the pivoting step.

BRIEF DESCRIPTION OF THE DRAWINGS

FIG. 2 shows a piston gripping robot 111 when viewed from its lower surface side;

DESCRIPTION OF THE EMBODIMENTS

First Embodiment

Figure 1:
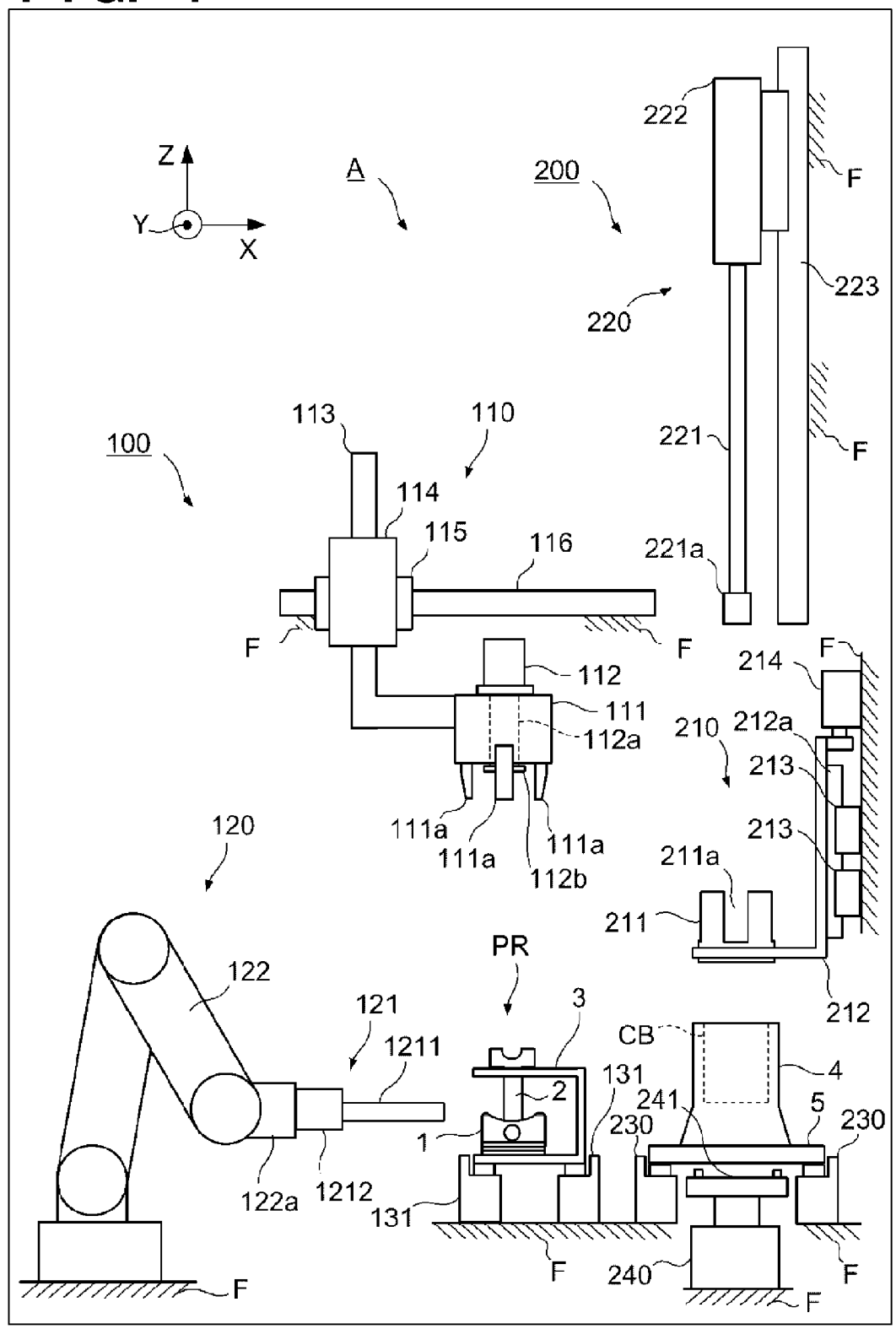
FIG. 1 is a view for explaining a piston assembly system A according to an embodiment of the present invention.

FIG. 1 is a view for explaining a piston assembly system A according to an embodiment of the present invention. Referring to FIG. 1 and other drawings, reference symbol Z denotes a vertical direction; and X and Y, horizontal directions perpendicular to each other. The piston assembly system A is an apparatus for inserting a piston 1 on which a connecting rod 2 is assembled into a cylinder bore CB formed in a cylinder block 4. Although the cylinder block 4 is assumed to be applied to an in-line multicylinder engine, this cylinder block can be applied to other types of engines having different cylinder arrangements and different cylinder counts. In addition, although this embodiment is assumed to insert the single piston 1 into the corresponding cylinder bore CB by one operation, the embodiment may have an arrangement configured to simultaneously insert a plurality of pistons 1 into a plurality of corresponding cylinder bores CB.

The piston assembly system A includes a frame F, on which constituent elements are supported. FIG. 1 shows the frame F in a simplified form. The piston assembly system A includes a piston supply apparatus 100 and a piston insertion apparatus 200.

<Piston Supply Apparatus>

The piston supply apparatus 100 includes a piston gripping portion 110 which grips and supplies the piston 1 to the piston insertion apparatus 200 and a piston supply portion 120 which supplies the piston to the piston gripping portion 110. The arrangement of the piston gripping portion 110 will be described first.

<Piston Gripping Portion 110>

The piston gripping portion 110 includes a piston gripping unit 111 as a gripping mechanism which grips the piston 1 in its radial direction. The piston gripping unit 111 has an almost cylindrical outer shape, and includes, at its lower portion, four gripping members 111a which grip the outer surface of the piston 1, together with a driving mechanism (not shown) which opens/closes the gripping members 111a. FIG. 2 shows the piston gripping unit 111 viewed from its lower surface side. The gripping members 111a extend in the Z direction and are provided at 90° intervals around the Z-axis. Of these gripping members, two members open and close in the X direction while facing each other, and the remaining two members open and close in the Y direction while facing each other. Referring to FIG. 2, a state 2A indicates a state in which the four gripping members 111a are open, and a state 2B indicates a state in which the four gripping members 111a are closed. This embodiment includes the four gripping members 111a. However, the embodiment may include two or three gripping members.

Referring to FIGS. 1 and 2, the piston gripping unit 111 includes a pressing unit 112 which presses the top portion of the piston 1 downward. In this embodiment, the pressing unit 112 is an electrically-driven or fluidic cylinder. A rod portion 112a of this unit extends downward through the central opening portion of the piston gripping unit 111. A disk-like pressing portion 112b is provided on the lower end portion of the rod portion. Note that the pressing unit 112 may be other than the cylinder as long as it can press the top portion of the piston 1.

As indicated in the state 2B in FIG. 2, the pressing portion 112b moves on a vertical line (a line in the Z direction) passing through a grip center CP of the piston gripping unit 111. In this embodiment, as described later, after the pressing unit 112 presses the top portion of the piston 1, the piston gripping unit 111 grips the piston 1. Since the pressing portion 112b is configured to move on the vertical line passing through the grip center CP, it is possible to continuously perform the operation of pressing the top portion of the piston 1 and gripping the piston 1. This makes it possible to shorten the tact time.

Referring to FIG. 1, the piston gripping portion 110 includes an L-shaped support member 113 which supports the piston gripping unit 111. An elevating unit 114 supports the support member 113 so as to allow it to freely move up and down. The elevating unit 114 includes a driving mechanism (not shown) which moves the piston gripping unit 111 up and down through the support member 113.

A moving unit 115 supports the elevating unit 114. The frame F supports the moving unit 115 so as to allow it to freely move in the X direction by being guided by a rail member 116 extending in the X direction. The moving unit 115 includes a driving mechanism (not shown) which moves the piston gripping unit 111 in the X direction through the elevating unit 114 and the support member 113.

<Piston Supply Portion 120>

Figure 3:
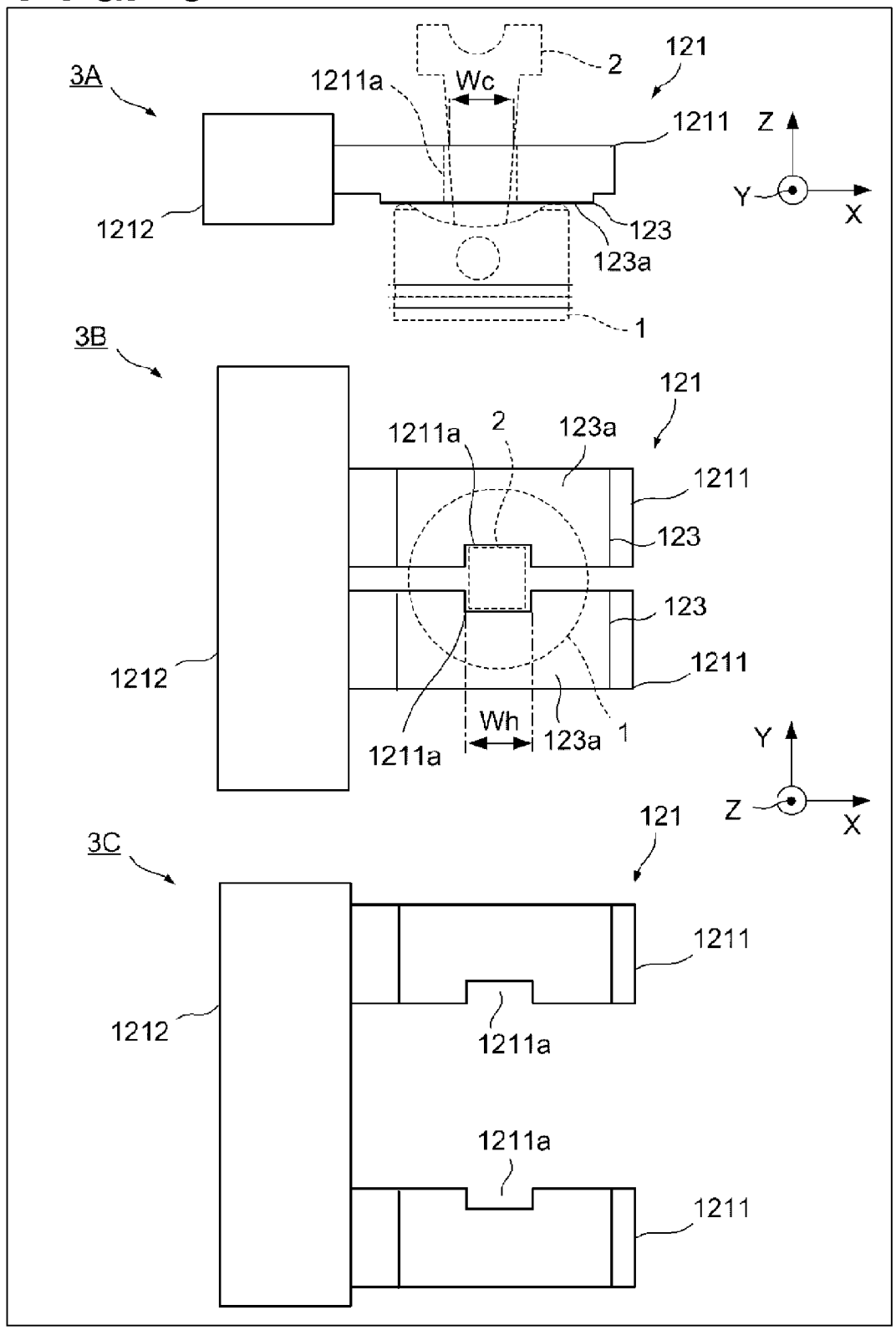
FIG. 3 explains a connecting rod gripping unit 121.

The piston supply portion 120 includes a connecting rod gripping unit 121. FIG. 3 explains the connecting rod gripping unit 121. In this embodiment, the connecting rod gripping unit 121 includes a pair of gripping members 1211 which grip the connecting rod 2 and a main body portion 1212 having a gripping mechanism which opens and closes the gripping members 1211 in the Y direction. Referring to FIG. 3, FIG. 3A is a side view of the connecting rod gripping unit 121 in the initial state, and FIGS. 3B and 3C are views of the connecting rod gripping unit 121 in the initial state when viewed from the lower side. FIG. 3B shows a state in which the pair of gripping members 1211 are closed. FIG. 3C shows a state in which they are open.

The gripping members 1211 have concave portions 1211a which sandwich the connecting rod 2. As shown in FIG. 3A, each guide member 123 has an abutment surface 123a which abuts against the lower end of the skirt portion of the piston 1 to match the axial direction of the piston 1 with a predetermined specified direction. In this embodiment, the guide member 123 is integrally provided on the gripping member 1211. In the embodiment, the specified direction is the Z direction. Therefore, the abutment surface 123a of the guide member 123 is formed into a horizontal surface.

In general, the connecting rod 2 is relatively small in width at an end portion (small end portion) on the piston 1 side and relatively large in width at an end portion (large end portion) on the opposite side. In this embodiment, a width Wh (FIG. 3B) of each concave portion 1211a in the X direction while the gripping members 1211 are closed is slightly larger than a width We (FIG. 3A) of the connecting rod 2 at an end portion of the concave portion 1211a while the lower end of the skirt portion of the piston 1 abuts against the abutment surface 123a of the guide member 123. This provides a margin for the allowable error of a gripping position when the pair of gripping members 1211 sandwich the connecting rod 2. At the same time, this arrangement allows the connecting rod 2 to slightly move in the Z and X directions relative to the concave portions 1211a.

Referring back to FIG. 1, the piston supply portion 120 includes a vertical multi-joint robot 122 which causes the connecting rod gripping unit 121 to move and pivot. The connecting rod gripping unit 121 is attached to a pivoting portion 122a provided on an end portion of the vertical multi-joint robot 122 to pivot. In addition, the connecting rod gripping unit 121 moves in the Z and X directions as each arm portion of the vertical multi-joint robot 122 pivots.

<Piston Insertion Apparatus>

The piston insertion apparatus 200 will be described next with reference to FIG. 1. The piston insertion apparatus 200 includes a piston holding unit 210, a pressing unit 220, and an elevating unit 240 which moves the cylinder block 4 up and down.

The piston holding unit 210 includes a guide tube portion 211 which accommodates the piston 1 and guides the piston 1 into the cylinder bore. The piston gripping portion 110 supplies the piston 1 to the guide tube portion 211. The piston gripping unit 111 of the piston gripping portion 110 grips the piston 1 while the diameter of the piston ring is reduced, and inserts the piston 1 into the guide tube portion 211 while the diameter of the piston ring is reduced. For this reason, the guide tube portion 211 has a notch 211a for avoiding interference with each of the gripping members 111a.

The piston holding unit 210 includes a support member 212 which supports the guide tube portion 211. The support member 212 is provided with a rail member 212a. Guiding the rail member 212a to a slider 213 supported on the frame F allows the support member 212 to move up and down in the Z direction. An elevating unit 214 is a driving mechanism for moving the support member 212 up and down. This mechanism is, for example, a cylinder.

The pressing unit 220 includes a pressing rod 221 extending in the Z direction, a slider 222 which supports the pressing rod 221, and a guide member 223 extending in the Z direction, which engages with the slider 222 and guides the movement of the slider 222 in the Z direction. The lower end portion of the pressing rod 221 is provided with a pressing portion 221a which abuts against the upper surface of the piston 1 inserted into the cylinder bore CB to press it. The pressing unit 220 includes a driving apparatus (not shown) which moves the slider 222 in the Z direction. This driving apparatus moves the slider 222 and the pressing rod 221 integrally move between the retraction position located above and the insertion position (where the piston 1 is inserted in the cylinder bore) located below. As this driving apparatus, for example, a rack-pinion mechanism using a motor as a drive source.

The elevating unit 240 is an apparatus, for example, a cylinder, which moves a table 241 up and down. A pair of roller conveyers 230 convey the cylinder block 4 mounted on a pallet 5 in the Y direction while the upper surface of the cylinder block 4 to which a cylinder head (not shown) is attached faces upward. The elevating unit 240 is placed below the guide tube portion 211 between the pair of roller conveyers 230. When the pallet 5 on which the cylinder block 4 as an assembly target is mounted is conveyed and positioned on the table 241, the elevating unit 240 moves the table 241 upward, lifts the cylinder block 4 from the pallet 5, and locates the cylinder block 4 to a position where mounting operation is to be performed.

<Example of Operation>

An example of the operation of the piston assembly system A will be described next with reference to FIGS. 1 and 6 to 11. The piston assembly system A automatically inserts the piston 1 in the cylinder bore CB under the control of a controller (not shown). As shown in FIG. 1, the piston 1 is placed in a piston preparation area PR. The piston 1 is supported on a pallet 3 and conveyed from the previous step by roller conveyers 131. The piston 1 is supported on the pallet 3 while the top portion of the piston 1 faces downward and the longitudinal direction of the connecting rod 2 faces the Z direction.

Figure 6:
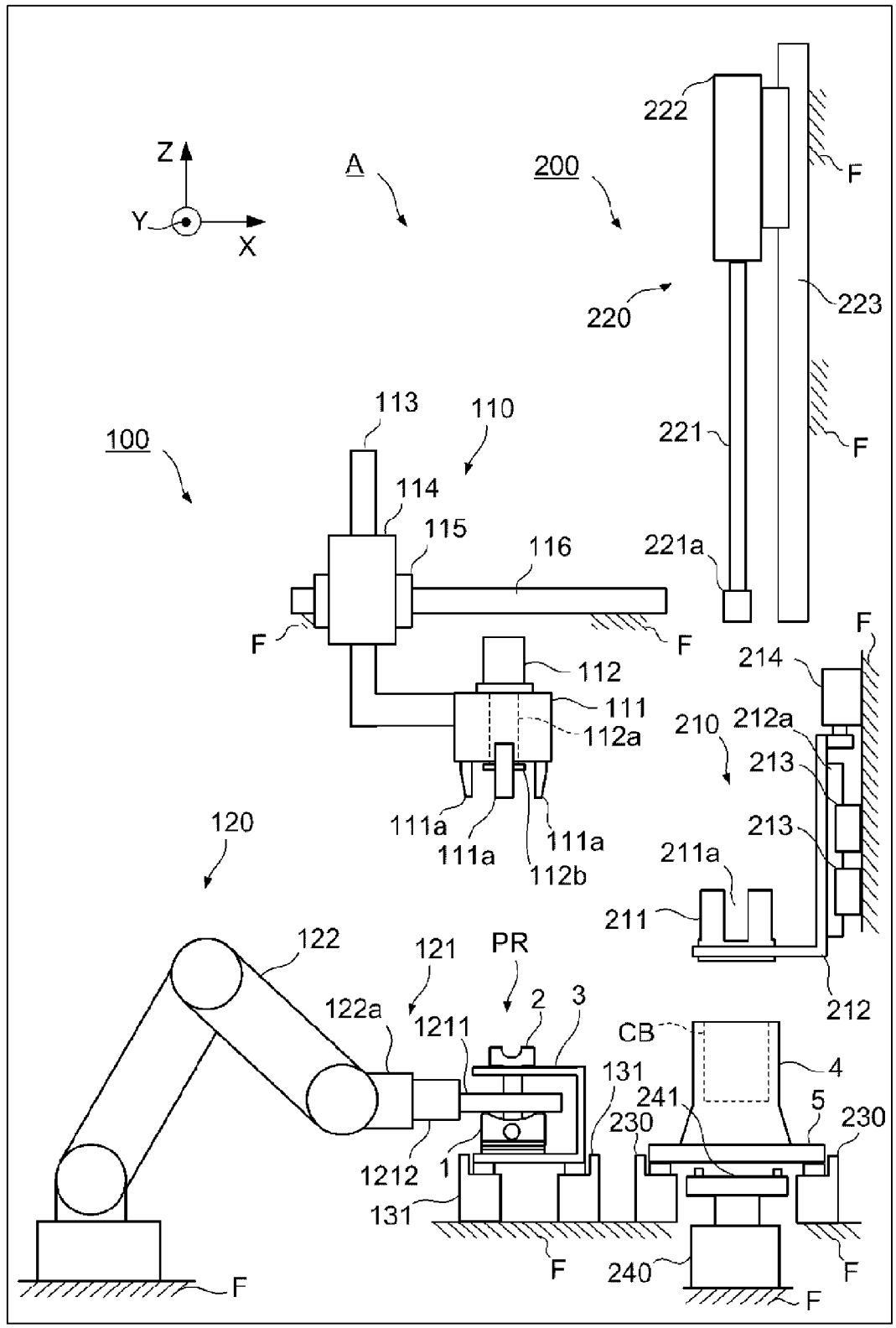
FIG. 6 is a view for explaining the operation of the piston assembly system A.

As shown in FIG. 6, first of all, the connecting rod gripping unit 121 of the piston supply portion 120 grips the connecting rod 2 of the piston 1 supported on the pallet 3 (gripping step). The following is concrete operation at this time. First of all, this apparatus opens the pair of gripping members 1211 of the connecting rod gripping unit 121, and makes the connecting rod gripping unit 121 pivot through the pivoting portion 122a so as to position the abutment surface 123a of the guide member 123 on the lower side of the gripping members 1211 in a horizontal state. The vertical multi-joint robot 122 moves the connecting rod gripping unit 121 to a position where the connecting rod 2 is positioned between the pair of gripping members 1211.

The apparatus then moves the connecting rod gripping unit 121 downward in the Z direction so as to make the abutment surface 123a of the guide member 123 abut against the lower end of the skirt portion of the piston 1, thereby positioning the piston 1. This makes the axial direction of the piston 1 face the Z direction. The apparatus the closes the pair of gripping members 1211 (see FIG. 3B) to grip the connecting rod 2. A state 4A in FIG. 4 indicates a state in which gripping of the connecting rod 2 is complete.

Figure 7:
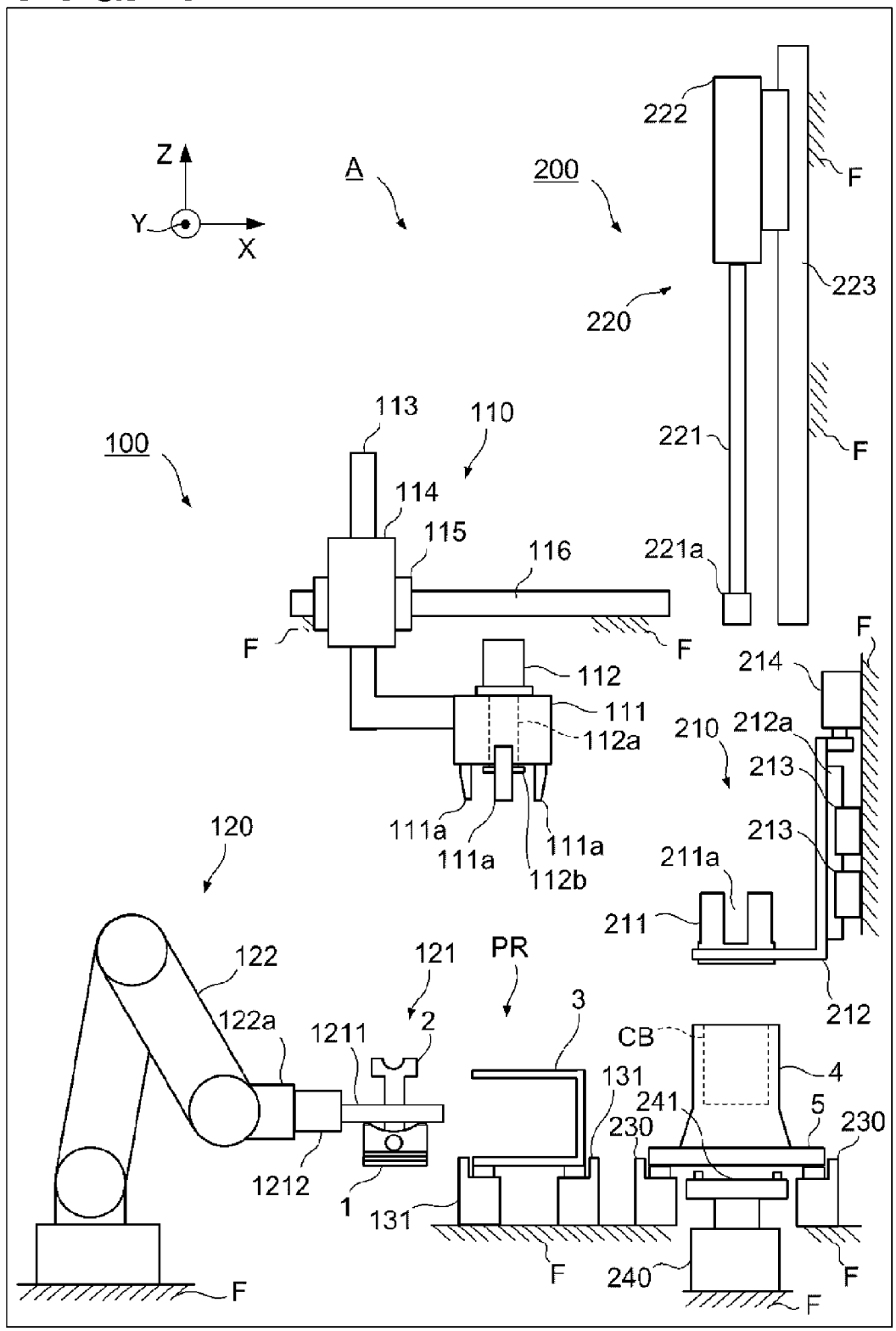
FIG. 7 is a view for explaining the operation of the piston assembly system A.

Upon completing the gripping of the connecting rod 2, as shown in FIG. 7, the vertical multi-joint robot 122 moves the connecting rod gripping unit 121 and picks up the piston 1 and the connecting rod 2 from the pallet 3. At this time, even if there is an error (gap) in the X direction between the gripping position of the gripping members 1211 and that of the connecting rod 2, the piston 1 slightly moves downward due to its own weight, resulting in a change in the gripping position of the chuck. As a result, a wider portion of the connecting rod 2 (a portion closer to the large end portion) hooks on the concave portions 1211a of the gripping members 1211 and is gripped by them. This cancels the error (gap) in the X direction.

Figure 8:
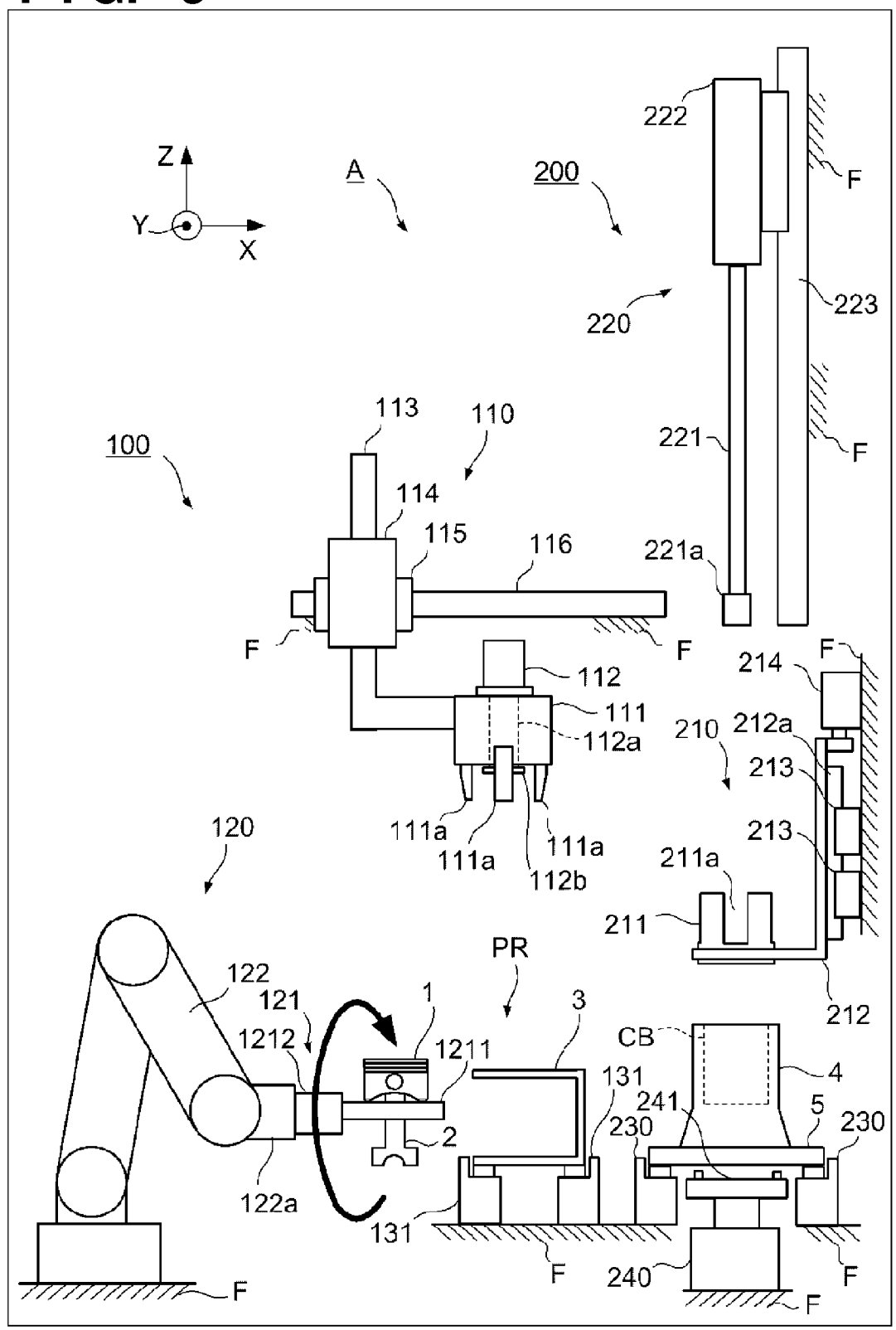
FIG. 8 is a view for explaining the operation of the piston assembly system A.
Figure 9:
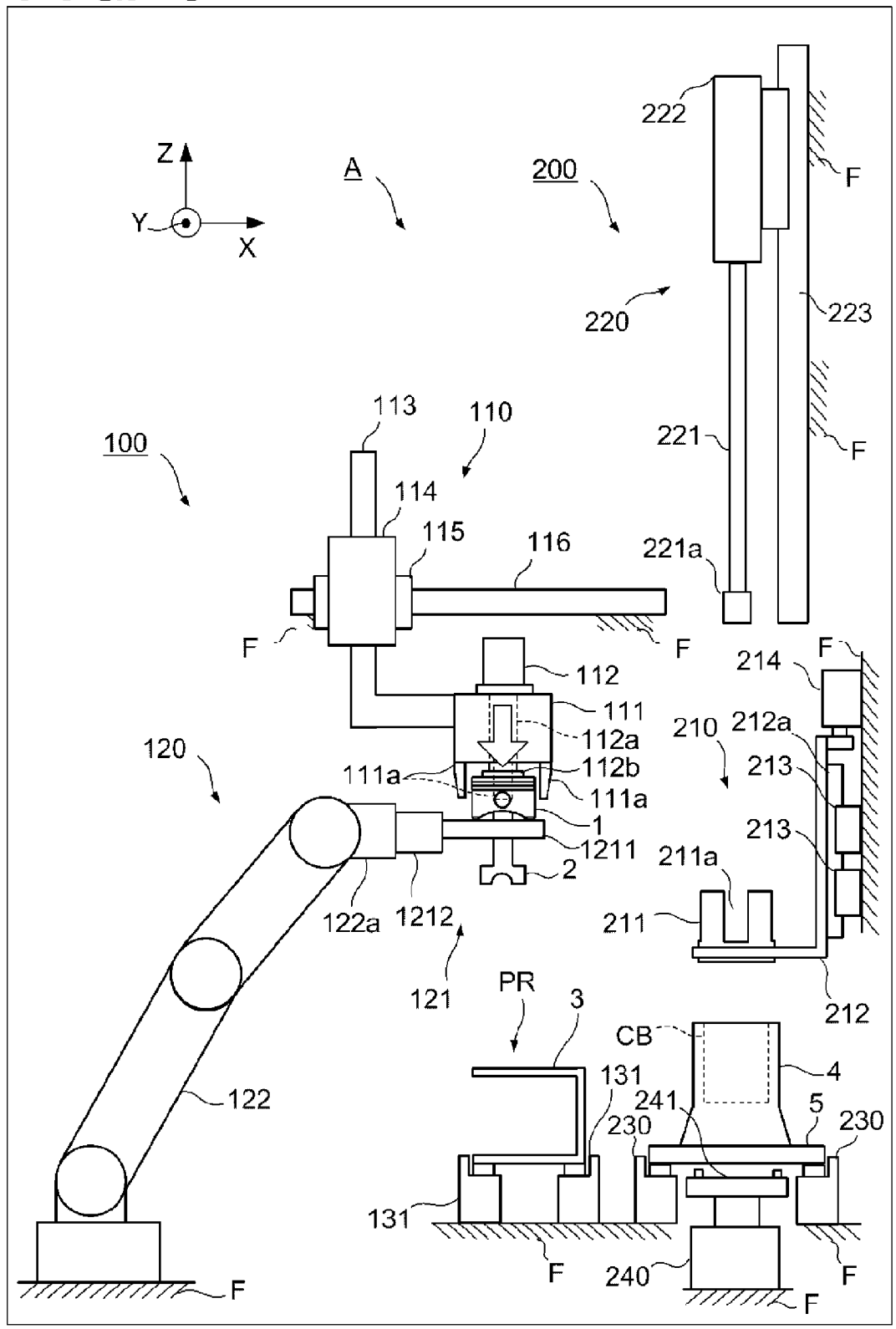
FIG. 9 is a view for explaining the operation of the piston assembly system A.

As shown in FIG. 8, the pivoting portion 122a makes the connecting rod gripping unit 121 gripping the connecting rod 2 pivot through 180° to reverse the posture of the piston 1 so as to make the top portion of the piston 1 in a downward state face upward (pivoting step). After the reversal of the posture of the piston 1, the vertical multi-joint robot 122 moves the connecting rod gripping unit 121 to a supply position in air at which the piston 1 is supplied to the piston gripping portion 110, as shown in FIG. 9 (moving step). The supply position is a position where the piston 1 is located coaxially with the grip center CP (see the state 2B in FIG. 2) of the piston gripping unit 111 of the piston gripping portion 110 and the piston gripping unit 111 in an open state can grip the piston 1. Note that the above pivoting step may be performed concurrently with the moving step. This can shorten the tact time.

Figure 4:
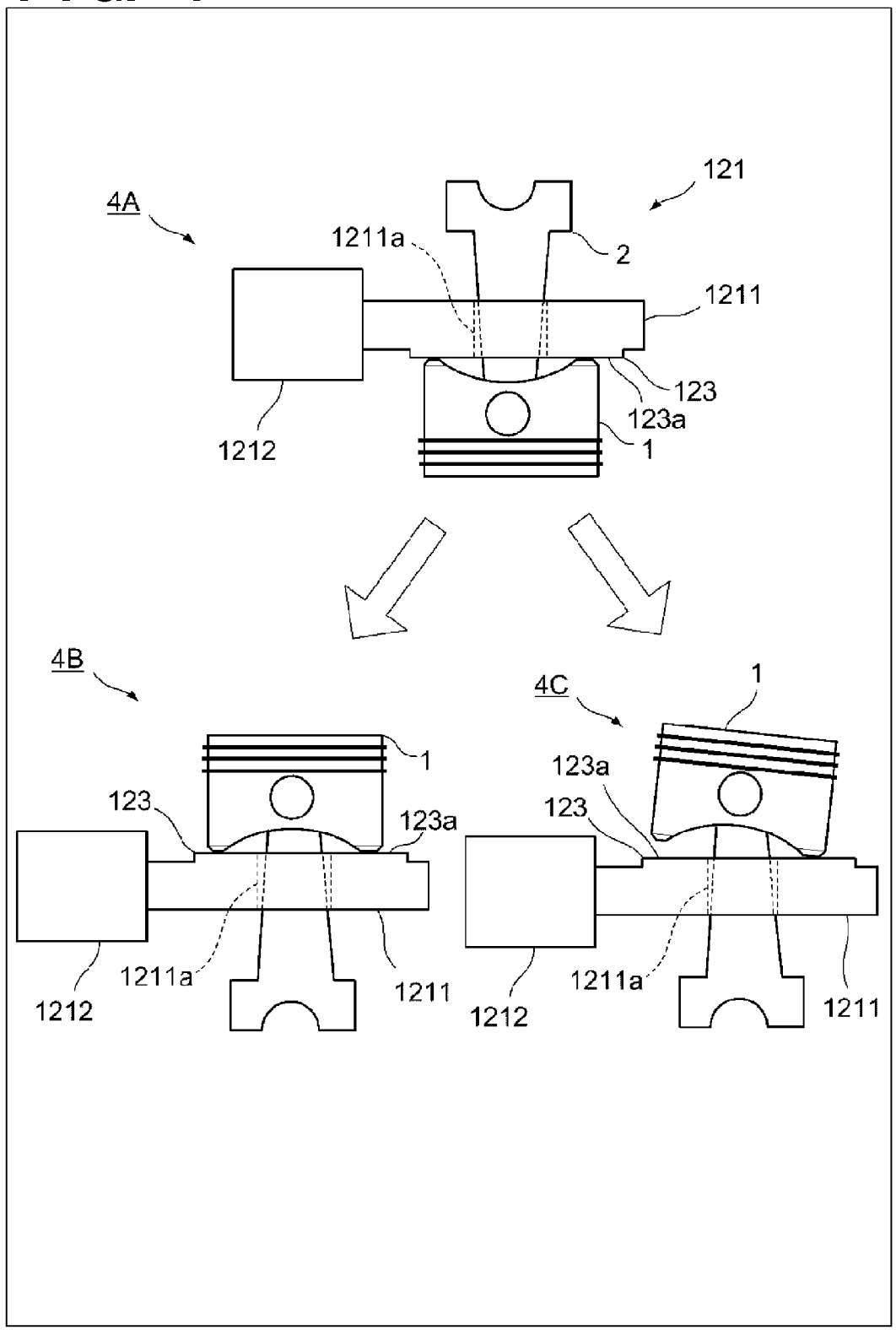
FIG. 4 explains a problem at the time of reversing a piston 1.

In the pivoting step, the posture may shift due to centrifugal force. FIG. 4 explains this state. Referring to FIG. 4, the state 4A is a state before posture reversal, and the state 4B indicates a state in which the posture of the piston 1 is reversed without any shift. The state 4C in FIG. 4 indicates a state in which the posture of the piston 1 has shifted due to posture reversal.

As described with reference to FIG. 3, this embodiment is configured to provide a margin for the allowable error of a gripping position when the pair of gripping members 1211 sandwich the connecting rod 2 and to allow the connecting rod 2 to slightly move in the Z and X directions relative to the concave portions 1211a. For this reason, when the piston 1 is reversed, the piston 1 and the connecting rod 2 may displace so as to come off the pair of gripping members 1211 due to centrifugal force. As indicated in the state 4C, the piston 1 may tilt and the lower end of the skirt portion of the piston 1 may partly separate from the abutment surface 123a of the guide member 123.

Letting the piston 1 keep tilting will cause a positional shift between the piston 1 and the piston gripping unit 111 of piston gripping portion 110 at the supply position in air. If, therefore, the piston gripping unit 111 grips the piston 1 in this state, the piston gripping unit 111 may not accurately grip the piston 1 and may receive an unnecessarily heavy load.

As shown in FIG. 9, therefore, upon moving the piston 1 to the supply position in air, the apparatus actuates the pressing unit 112 to lower the pressing portion 112b while keeping the piston gripping unit 111 in the open state. The pressing portion 112b presses the top portion of the piston 1 to press the piston 1 toward the abutment surface 123a (horizontal guide portion) of the guide member 123 which is placed near the lower end of the skirt portion of the piston 1 (guiding step). As a result, the posture of the top portion of the piston 1 is corrected from the tilted state shown in the state 4C in FIG. 4 to the proper horizontal posture shown in the state 4B.

The apparatus closes the piston gripping unit 111 to grip the piston 1 with the four gripping members 111a. Since the posture of the piston 1 has already been corrected to the proper posture, it is possible to transfer the piston 1 in air with high precision and more reliability.

Figure 5:
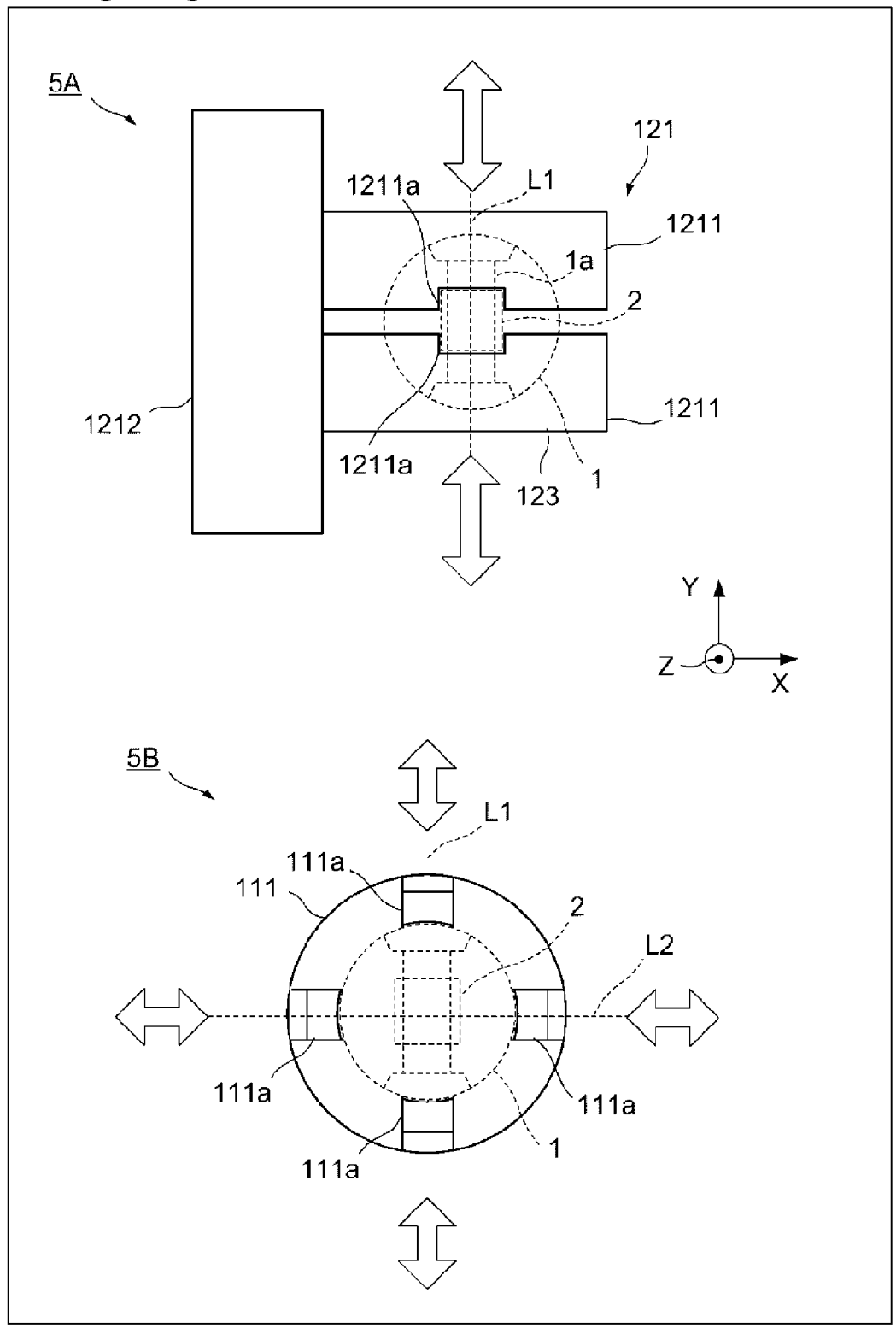
FIG. 5 explains a preferable gripping direction.

In this case, as described above, the supply position is a position where the piston 1 is located coaxially with the grip center CP of the piston gripping unit 111 of the piston gripping portion 110. Since this position is located in air, the piston 1 is susceptible to errors in the horizontal direction. It is possible to absorb such an error in the opening/closing direction of the pair of the gripping members 1211 of the connecting rod gripping unit 121. FIG. 5A in FIG. 5 explains this.

In the case shown in FIG. 5A, the opening/closing direction of the pair of gripping members 1211 matches the axial direction (line L1; Y direction) of a piston pin 1a coupling the connecting rod 2 to the piston 1. The connecting rod 2 is generally configured to slightly move on the piston pin 1a in its axial direction. It is therefore possible to absorb an error in the Y direction by relatively moving the connecting rod 2 and the piston 1 in the axial direction of the piston pin 1a.

It is possible to absorb an error in the X direction by relative displacement between the connecting rod 2 and the pair of gripping members 1211. This is because, as described above, this embodiment is configured to allow the connecting rod 2 to slightly move in the X direction relative to the concave portions 1211a.

As described above, in this embodiment, even if the piston 1 slightly shifts from the grip center CP of the piston gripping unit 111 of the piston gripping portion 110 at the supply position, since the piston 1 can move in the horizontal direction to some degree, it is possible to avoid any stress on the piston gripping unit 111.

In order to smoothly absorb the above error, as shown in FIG. 5B in FIG. 5, the opening/closing direction of one pair of the gripping members 111a of the piston gripping unit 111 preferably coincides with a line L1 direction (Y direction) as the axial direction of the piston pin 1a, and the opening/closing direction of the other pair of the gripping members 111a preferably coincides with a line L2 direction (X direction) perpendicular to the line L1.

Figure 10:
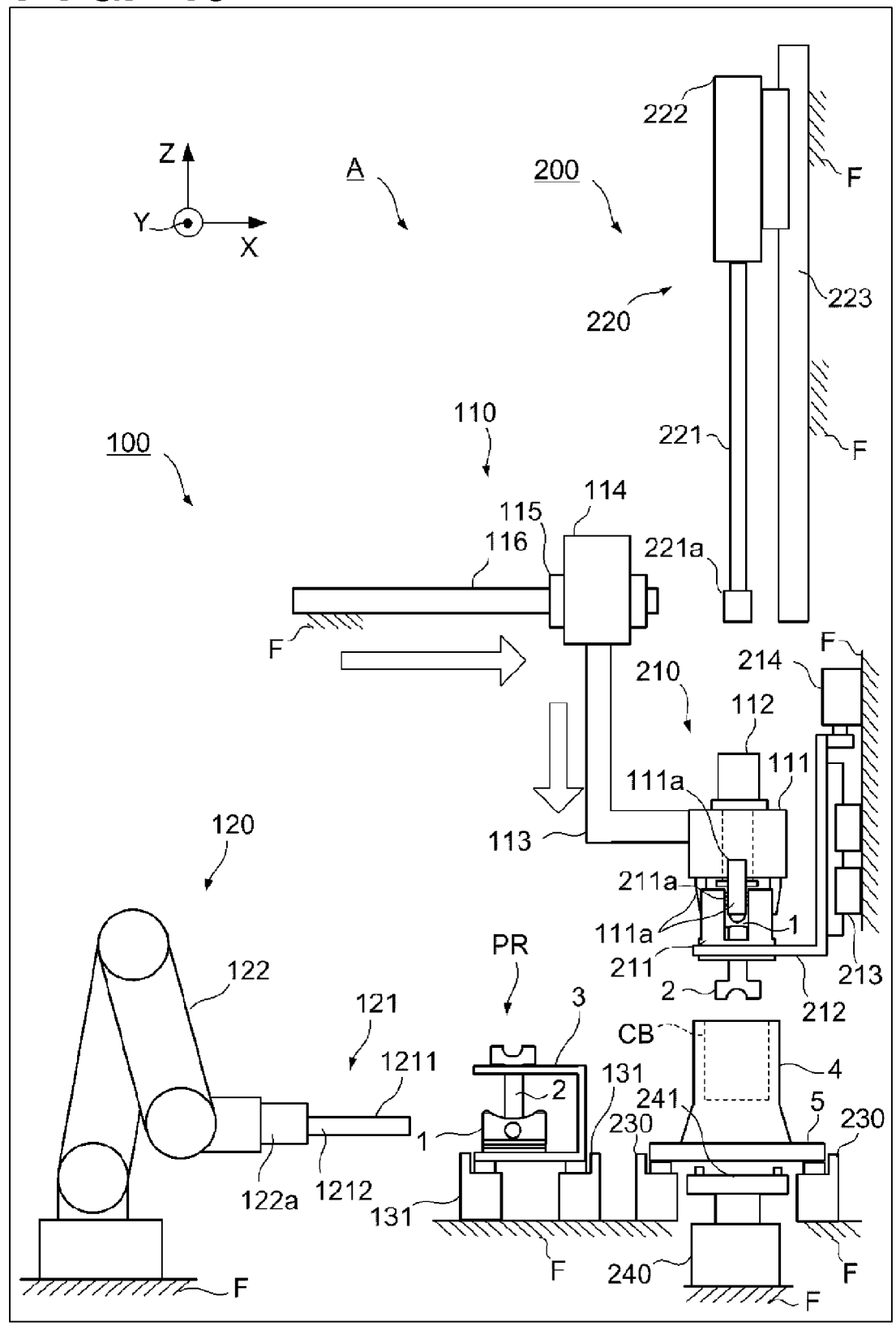
FIG. 10 is a view for explaining the operation of the piston assembly system A.

When the piston gripping unit 111 completely grips the piston 1, the apparatus retracts the connecting rod gripping unit 121, actuates the moving unit 115 to move the piston gripping unit 111 on the guide tube portion 211, and actuates the elevating unit 114 to move the piston gripping unit 111 downward, as shown in FIG. 10. This inserts the piston 1 into the guide tube portion 211. Thereafter, the apparatus retracts the piston gripping unit 111 and shifts to the operation of inserting the piston 1 into the cylinder bore CB.

Figure 11:
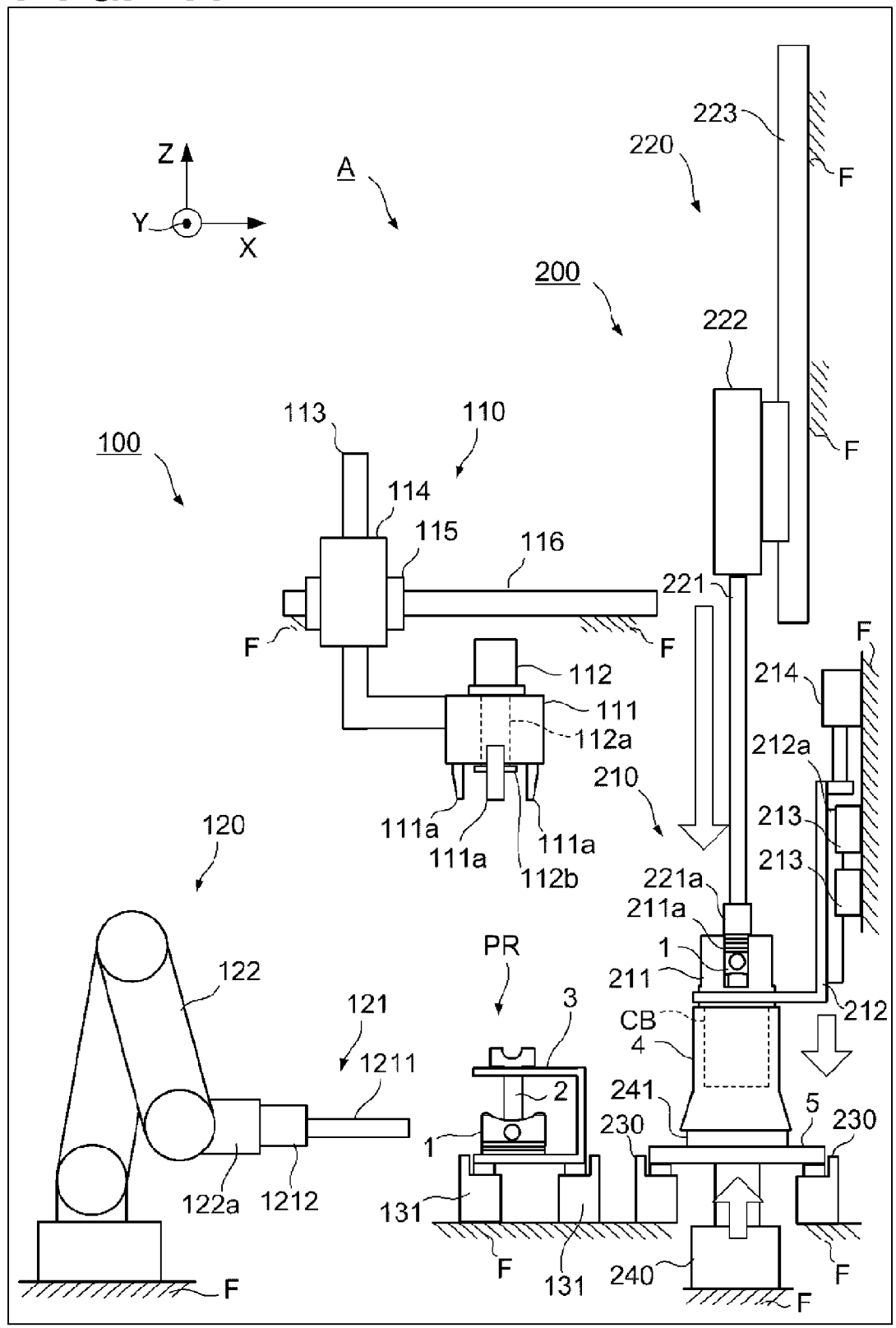
FIG. 11 is a view for explaining the operation of the piston assembly system A.

When inserting the piston 1 into the cylinder bore CB, as shown in FIG. 11, the apparatus moves the cylinder block 4 upward to the operation position by using the elevating unit 240. The apparatus moves the guide tube portion 211 downward to the operation position by using the elevating unit 214 to make the guide tube portion 211 abut against the upper surface of the cylinder block 4 while the cylinder bore CB and the guide tube portion 211 are coaxially located. The apparatus then moves the pressing rod 221 downward from the retraction position to the insertion position. The pressing portion 221a of the pressing rod 221 presses the piston 1 downward to inert the piston 1 into the cylinder bore CB. With this operation, the apparatus completes the insertion of the piston 1 into the cylinder bore CB. Repeating the above steps can continuously and sequentially insert the plurality of pistons 1 into the corresponding cylinder bores CB.

Second Embodiment

Figure 12:
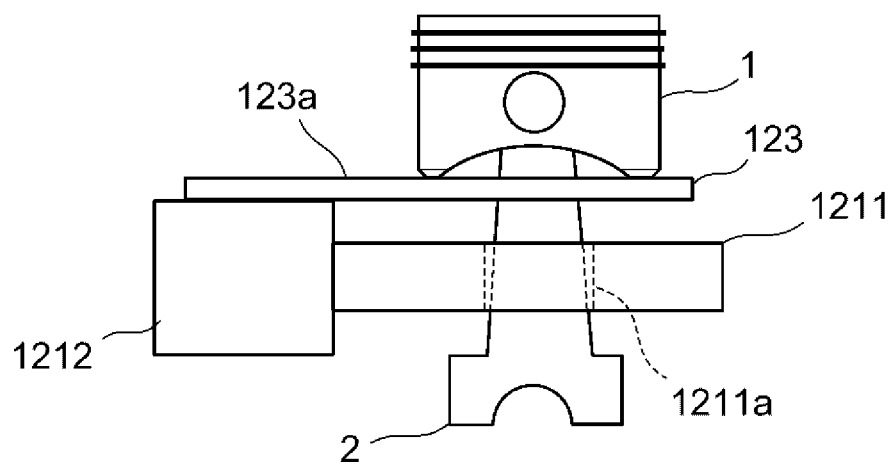
FIG. 12 is a view showing another placement example of a guide member 123.

The above embodiment includes the guide member 123 and the gripping members 1211 as integral members. However, these members may be separate members and may be provided on a portion other than the gripping members 1211. FIG. 12 shows another placement of a guide member 123. In the case shown in FIG. 12, a main body portion 1212 supports the guide member 123.

Third Embodiment

Figure 13:
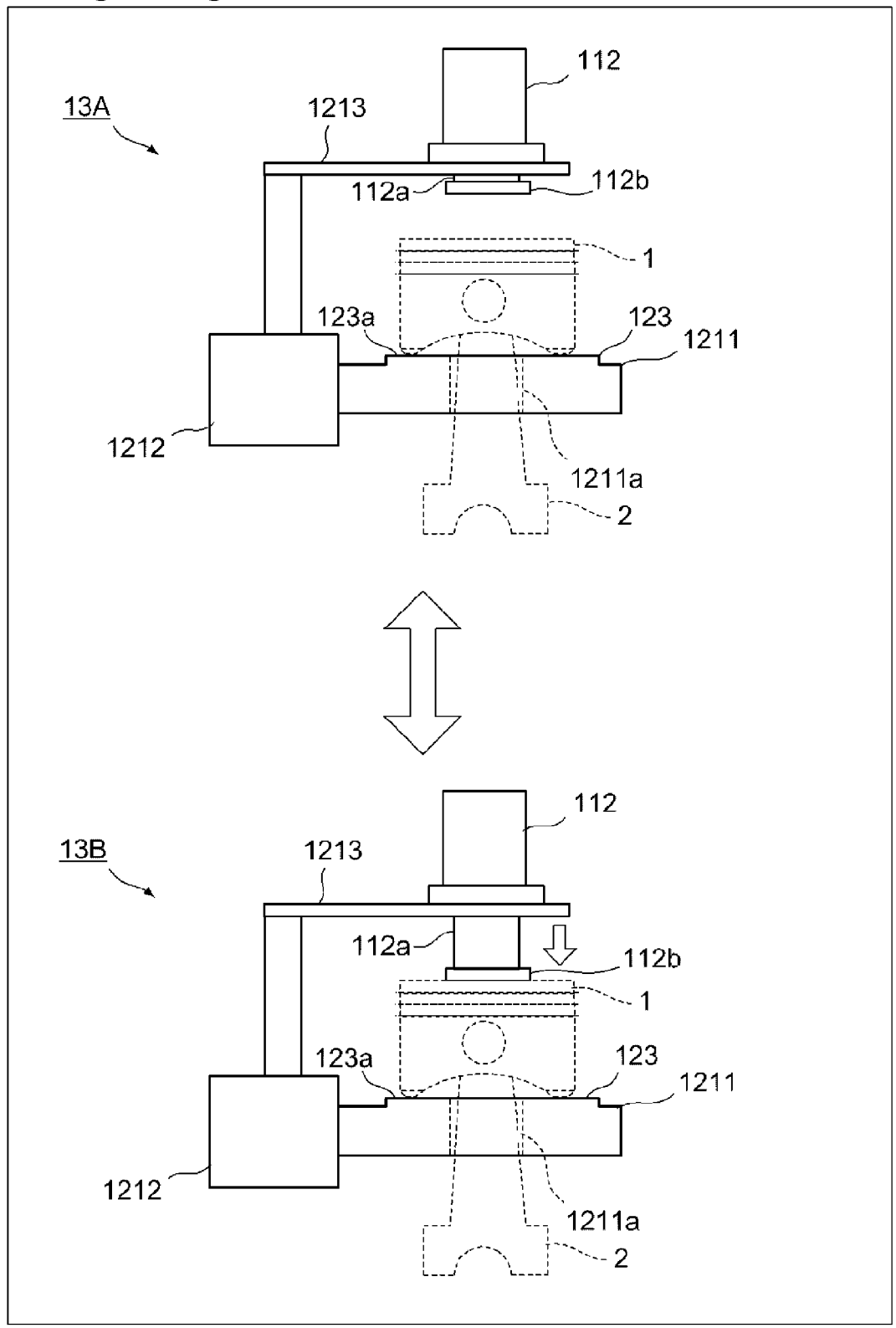
FIG. 13 shows an example in which a pressing unit 112 is provided for the connecting rod gripping unit 121.

In the above embodiment, the pressing unit 112 is provided on the piston gripping unit 111. However, the pressing unit 112 may be placed at a different position. For example, the pressing unit 112 may be independently placed midway along the path of the movement of a piston 1 by a piston supply portion 120. A pressing unit 112 may also be provided on a connecting rod gripping unit 121. FIG. 13 shows a case in which the connecting rod gripping unit 121 is provided with the pressing unit 112.

In the case shown in FIG. 13, a main body portion 1212 supports the pressing unit 112 through a support member 1213. The state 13A indicates the non-operating time of the pressing unit 112, at which a pressing portion 112b is spaced apart from the top portion of the piston 1. The state 13B indicates the operating time of the pressing unit 112, at which the pressing portion 112b presses the top portion of the piston 1 to press the piston 1 against a guide member 123.

As in the case shown in FIG. 13, when the connecting rod gripping unit 121 is provided with the pressing unit 112, the apparatus can concurrently perform the above pivoting step and guiding step during the above moving step of moving the piston 1 to the supply position in air. This will shorten the tact time.

Fourth Embodiment

In the above embodiment, in the gripping step of making the connecting rod gripping unit 121 grip the connecting rod 2, the apparatus moves the connecting rod gripping unit 121 downward in the Z direction so as to make the abutment surface 123a of the guide member 123 abut against the lower end of the skirt portion of the piston 1 to position the piston 1. However, this positioning operation may be omitted. In addition, the side surfaces of the concave portions 1211a of the gripping members 1211 may tilt in accordance with a change in the width of the connecting rod 2. This embodiment will be described below with reference to FIGS. 14 and 15.

Figure 14:
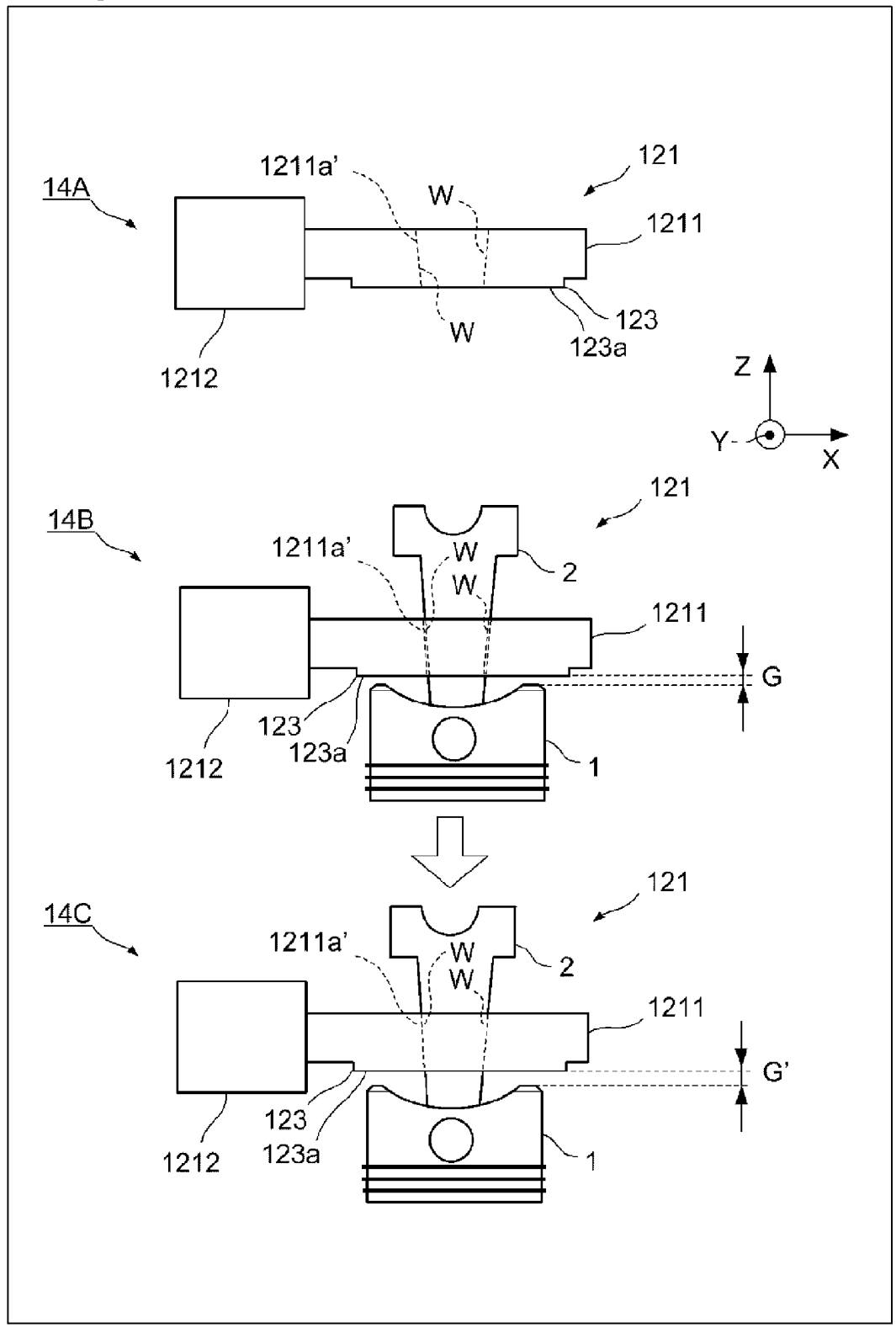
FIG. 14 explains the connecting rod gripping unit 121.

FIG. 14A in FIG. 14 is a side view of a connecting rod gripping unit 121 in this embodiment. In the embodiment, side surfaces W of each concave portion 1211a' corresponding to the concave portion 1211a in the first embodiment described above, which face each other in the X direction, tilt. In the case shown in FIG. 14A, the width between the side surfaces W is smaller on the abutment surface 123a side than on the opposite side. The side surfaces W tilt in accordance with a change in the width of a connecting rod 2.

FIG. 14B in FIG. 14 shows a state in which the connecting rod gripping unit 121 in this embodiment grips the connecting rod 2 of a piston 1 supported on a pallet 3 as shown in FIG. 6.

In this embodiment, the connecting rod gripping unit 121 grips the connecting rod 2 at the position where the lower end of the skirt portion of the piston 1 is spaced apart from the abutment surface 123a by a distance G. Omitting the above positioning operation can shorten the tact time and eliminates the necessity to perform any control for making the abutment surface 123a of the guide member 123 abut against the lower end of the skirt portion of the piston 1 and to use any sensor or the like required for the control. Note that in this state, there are slight gaps between the side surfaces W and the connecting rod 2.

FIG. 14C in FIG. 14 shows a state in which the connecting rod gripping unit 121 picks up the piston 1 from the pallet 3 as shown in FIG. 7. At this time, the piston 1 and the connecting rod 2 move downward due to their own weights up to the position where there are no gaps between the side surfaces W and the connecting rod 2. As a result, the distance between the lower end of the skirt portion of the piston 1 and the abutment surface 123a increases to G' (>G).

Figure 15:
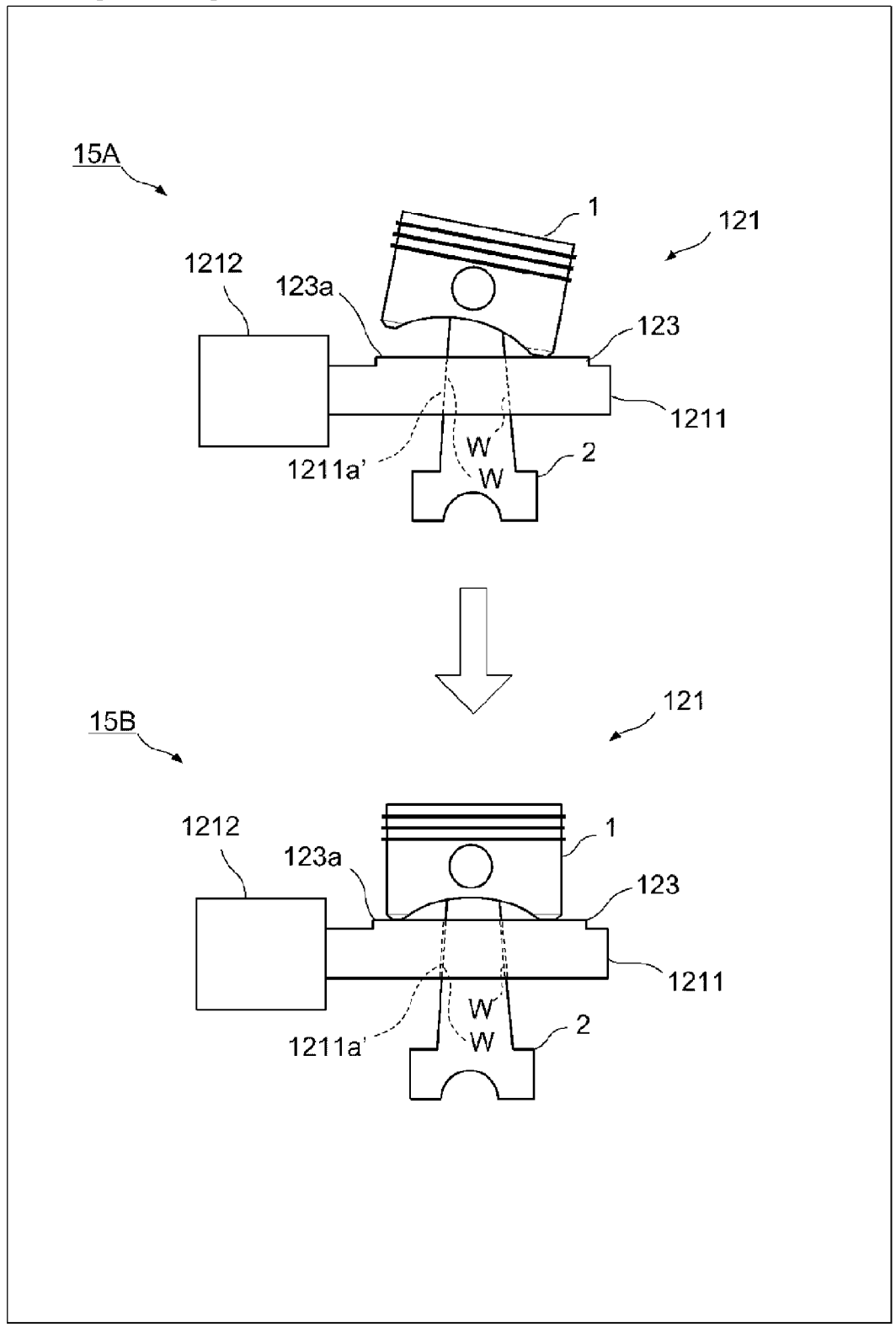
FIG. 15 explains the connecting rod gripping unit 121.

As shown in FIG. 8, a pivoting portion 122a causes the connecting rod gripping unit 121 in this state to pivot through 180°, thereby revering the posture of the piston 1. As a result, as indicated by FIG. 15A in FIG. 15, the posture of the piston 1 shifts. Subsequently, however, as shown in FIG. 9, the guiding step using a pressing unit 112 corrects the posture of the top portion of the piston 1 to a proper horizontal posture as shown in FIG. 15B in FIG. 15.

In the state shown in FIG. 15B, slight gaps are formed again between the surfaces W and the connecting rod 2. In this state, the connecting rod 2 is allowed to slightly move in the X direction relative to the concave portions 1211a'. Therefore, when a piston gripping unit 111 grips the piston 1, a positional shift in the X direction is absorbed by the movement of the connecting rod 2 relative to the concave portions 1211a'.

What is claimed is:

1. A piston supply apparatus comprising
a piston gripping portion which grips a piston to which a connecting rod is assembled so as to insert the piston into a cylinder bore, and
a piston supply portion which supplies the piston to the piston gripping portion, wherein
said piston supply portion comprises
a connecting rod gripping unit which grips the connecting rod of the piston placed in a preparation area while a piston top portion faces downward,
a guide member which abuts against an end portion of a skirt portion of the piston which is located on an opposite side to the piston top portion so as to match an axial direction of the piston with a predetermined specified direction,
a moving unit which moves said connecting rod gripping unit gripping the connecting rod from the preparation area to a supply position in air at which the piston is supplied to said piston gripping portion, and
a pivoting unit which makes said connecting rod gripping unit pivot such that the piston top portion of the piston into the downward state is set in an upward state, and
the piston supply apparatus further comprises a pressing unit which presses the piston top portion of the piston made to pivot to the upward state against said guide member before said piston gripping portion grips the piston.

2. The piston supply apparatus according to claim 1, wherein said connecting rod gripping unit comprises a pair of gripping members which sandwich the connecting rod, the gripping members opening and closing in an axial direction of a piston pin coupling the connecting rod to the piston.

3. The piston supply apparatus according to claim 1, wherein said connecting rod gripping unit comprises a pair of gripping members which sandwich the connecting rod, and
said guide member is provided for the pair of gripping members.

4. The piston supply apparatus according to claim 1, wherein said piston gripping portion includes a gripping mechanism which grips the piston in a radial direction thereof, and
said pressing unit comprises a pressing portion which moves on a vertical line passing through a grip center of the gripping mechanism and presses the piston top portion of the piston against said guide member.

5. The piston supply apparatus according to claim 1, wherein said pressing unit is provided for said connecting rod gripping unit.

6. A piston supply apparatus comprising
a piston gripping portion which grips a piston to which a connecting rod is assembled so as to insert the piston into a cylinder bore, and
a piston supply portion which supplies the piston to the piston gripping portion, wherein
said piston supply portion comprises
a connecting rod gripping means which grips the connecting rod of the piston placed in a preparation area while a piston top portion faces downward,
a guide member which abuts against an end portion of a skirt portion of the piston which is located on an opposite side to the piston top portion so as to match an axial direction of the piston with a predetermined specified direction,
a moving means which moves said connecting rod gripping unit gripping the connecting rod from the preparation area to a supply position in air at which the piston is supplied to said piston gripping portion, and
a pivoting means which makes said connecting rod gripping means pivot such that the piston top portion of the piston into the downward state is set in an upward state, and
the piston supply apparatus further comprises a pressing means which presses the piston top portion of the piston made to pivot to the upward state against said guide member before said piston gripping portion grips the piston.

* * * * *